(12) United States Patent
Drugge et al.

(10) Patent No.: US 9,247,491 B2
(45) Date of Patent: Jan. 26, 2016

(54) RECEIVER AND A METHOD THEREIN
(71) Applicant: ST-Ericsson SA, Plan-les-Ouates (CH)
(72) Inventors: Oskar Drugge, Malmo (SE); Koichi Kojima, Yokohama (JP); Max Larsson, Lund (SE); Torgny Palenius, Lund (SE); Benny Stenlund, Lulea (SE)
(73) Assignee: ST-ERICSSON SA, Plan-les-Outes (CH)
( * ) Notice: Subject to any disclaimer, the term of this patent is extended or adjusted under 35 U.S.C. 154(b) by 0 days.
(21) Appl. No.: 14/378,752
(22) PCT Filed: Mar. 12, 2013
(86) PCT No.: PCT/EP2013/054929
§ 371 (c)(1),
(2) Date: Aug. 14, 2014
(87) PCT Pub. No.: WO2013/135651
PCT Pub. Date: Sep. 19, 2013

(65) Prior Publication Data
US 2015/0208328 A1  Jul. 23, 2015

Related U.S. Application Data
(60) Provisional application No. 61/611,078, filed on Mar. 15, 2012.

(30) Foreign Application Priority Data
Mar. 15, 2012 (EP) .................................... 12159575
Jun. 19, 2012 (EP) .................................... 12172563

(51) Int. Cl.
*H04W 48/16* (2009.01)
*H04B 1/7083* (2011.01)
(Continued)
(52) U.S. Cl.
CPC ............. *H04W 48/16* (2013.01); *H04B 1/7083* (2013.01); *H04B 1/7087* (2013.01);
(Continued)

(58) Field of Classification Search
CPC ............. H04L 27/2657; H04L 27/2686; H04J 11/0086; H04W 48/16; H04W 56/00; H04W 88/08; H04B 1/7083; H04B 1/7087
See application file for complete search history.

(56) References Cited

U.S. PATENT DOCUMENTS 8,938,268 B2 * 1/2015 Zhang et al. .................. 455/501
2003/0231605 A1 12/2003 Amerga et al.
(Continued)

FOREIGN PATENT DOCUMENTS

WO 2007/036869 A2 4/2007

OTHER PUBLICATIONS

International Search Report issued in corresponding International application No. PCT/EP2013/054929, date of mailing Apr. 25, 2013.
(Continued)

*Primary Examiner* — Kenneth Lam
(74) *Attorney, Agent, or Firm* — Patent Portfolio Builders PLLC

(57) ABSTRACT

A receiver 10 and method in the receiver for cell search to find an actual base station having a carrier frequency in a radio communications network 1. The receiver detects a first signal representative of a base station 12, 14, 16, 18 by performing slot synchronisation, frame synchronization, cell identification, measurement of a signal quality of the first signal and comparison of the measured signal quality with a first threshold value. When a first signal having a signal quality that is greater than the first threshold value has been detected, the receiver searches for at least one second signal representative of a base station for at least one frequency offset comprised in a set of offsets S3. Further, when one or more second signals are detected, the receiver selects the signal with the highest signal quality, and detects a broadcast radio channel representative of a base station for the selected signal.

14 Claims, 10 Drawing Sheets

(51) Int. Cl.
*H04B 1/7087* (2011.01)
*H04J 11/00* (2006.01)
*H04L 27/26* (2006.01)
*H04W 56/00* (2009.01)
*H04W 88/08* (2009.01)

(52) U.S. Cl.
CPC ........ *H04J 11/0086* (2013.01); *H04L 27/2657* (2013.01); *H04L 27/2686* (2013.01); *H04W 56/00* (2013.01); *H04W 88/08* (2013.01)

(56) References Cited

U.S. PATENT DOCUMENTS

| | | | |
|---|---|---|---|
| 2005/0075125 A1* | 4/2005 | Bada et al. | 455/525 |
| 2007/0230591 A1* | 10/2007 | Choi et al. | 375/260 |
| 2008/0095108 A1* | 4/2008 | Malladi et al. | 370/329 |
| 2011/0007657 A1* | 1/2011 | Kazmi et al. | 370/252 |
| 2011/0026413 A1* | 2/2011 | Swarts et al. | 370/252 |
| 2011/0058528 A1* | 3/2011 | Chang et al. | 370/330 |
| 2011/0103534 A1* | 5/2011 | Axmon et al. | 375/371 |
| 2011/0223901 A1 | 9/2011 | Swarts et al. | |
| 2011/0280223 A1* | 11/2011 | Maeda et al. | 370/335 |
| 2013/0121188 A1* | 5/2013 | Das et al. | 370/252 |
| 2013/0122822 A1* | 5/2013 | Srinivasan et al. | 455/67.13 |
| 2013/0176991 A1* | 7/2013 | Yi | 370/336 |
| 2014/0315568 A1* | 10/2014 | Liu | 455/452.2 |

OTHER PUBLICATIONS

Written Opinion of the International Searching Authority issued in corresponding International application No. PCT/EP2013/054929, date of mailing Apr. 25, 2013.

\* cited by examiner

US 9,247,491 B2

RECEIVER AND A METHOD THEREIN

TECHNICAL FIELD

Embodiments herein relates to a receiver and a method therein. Especially, embodiments relate to initial cell search to find a true base station having a carrier frequency in a radio communications network.

BACKGROUND

In radio communications networks, a user equipment performs a cell search in order to find a base station. When performing the cell search and due to correlation of signals transmitted from one or more base stations, the user equipment may find a so-called false cell. The false cell is herein sometimes also referred to as a ghost cell and corresponds to a non-existing base station, i.e. the ghost cell is not served by a base station. The user equipment will not know whether or not the found cell is a false cell and will therefore try to read a broadcast signal which broadcast signal does not exist. Thus, the user equipment will spend time and power trying to read a non-existing broadcast signal.

US 2011/0103534 discloses a method for handling ghost cells in a Long Term Evolution (LTE) communications system. The method identifies hypothetical ghost cell frequencies based on the LTE Primary Synchronization Sequence (PSS) signal. Further, the method creates a list of hypothetical frequency/timing offset pairs based on finding a first correlation peak based on the LTE PSS only, i.e. based on one signal only. The different hypothesises are then examined through the use of frequency domain processing of the LTE Secondary Synchronization Sequence (SSS), which is able to discriminate between incorrect and correct hypothesises.

SUMMARY

An object of embodiments herein is to provide a way of improving the performance in a communications network.

According to a first aspect of embodiments herein, the object is achieved by a method in a receiver for cell search to find an actual base station having a carrier frequency in a radio communications network.

The receiver detects a first signal representative of a base station by performing slot synchronisation, frame synchronization, cell identification, and by performing measurement of a signal quality of the first signal and comparison of the measured signal quality with a first threshold value.

When a first signal having a signal quality that is greater than the first threshold value has been detected, the receiver searches for at least one second signal representative of a base station for at least one frequency offset comprised in a set of offsets.

Further, when one or more second signals are detected, the receiver selects the signal with the highest signal quality, and detects a broadcast radio channel representative of a base station for the selected signal.

According to a second aspect of embodiments herein, the object is achieved by a receiver for cell search to find an actual base station having a carrier frequency in a radio communications network.

The receiver comprises a detecting circuit configured to detect a first signal representative of a base station by performing slot synchronisation, frame synchronization, cell identification, and by performing measurement of a signal quality of the first signal and comparison of the measured signal quality with a first threshold value.

The receiver comprises further a searching circuit configured to, when a first signal having a signal quality that is greater than the first threshold value has been detected, search for at least one second signal representative of a base station for at least one frequency offset comprised in a set of offsets.

A selecting circuit is comprised in the receiver. The selecting circuit is configured to, when one or more signals are detected, select the signal with the highest signal quality.

Further, the detecting circuit is further configured to, when one or more signals are detected, detect a broadcast radio channel representative of a base station for the selected second signal.

Since the receiver searches for at least one second signal representative of a base station for at least one frequency offset comprised in a set of offsets, when a first signal having a signal quality that is greater than the first threshold value has been detected, and since the receiver further selects the signal with the highest signal quality and detects a broadcast radio channel representative of a base station for the selected second signal, getting stuck or spending unnecessary time on ghost cells is avoided. This results in an improved performance in the communications network.

An advantage of embodiments herein is that, when performing cell search, getting stuck or spending unnecessary time on ghost cells is avoided.

A ghost cell (or false cell) may be defined as when one or more characteristics of a signal received by a receiver give an impression that there is a cell at a certain position (e.g. carrier, frequency offset, time offset, etc), while in fact no true (actual) cell (i.e. served by a base station) is there. Possible reasons for such ghost cells will follow.

If the initial cell search is for cells with a frequency inaccuracy of up to 40 kHz, then when a cell with 40 kHz error is found, the receiver, e.g. a user equipment, may lock to that frequency assuming it is a valid frequency on the 200 kHz carrier grid. If the found cell is a ghost cell there is a risk that the UE from then on will search at erroneous frequencies leading to other true (actual) cells on the true 200 kHz carrier grid being left undetected. A further advantage of embodiments herein is that this is avoided.

A yet further advantage of embodiments herein is that true cells are not blocked by coincidental high correlation between CPICH and other channelization codes corrupted by a frequency error.

BRIEF DESCRIPTION OF THE DRAWINGS

Examples of embodiments herein are described in more detail with reference to attached drawings in which.

DETAILED DESCRIPTION

Figure 1A:
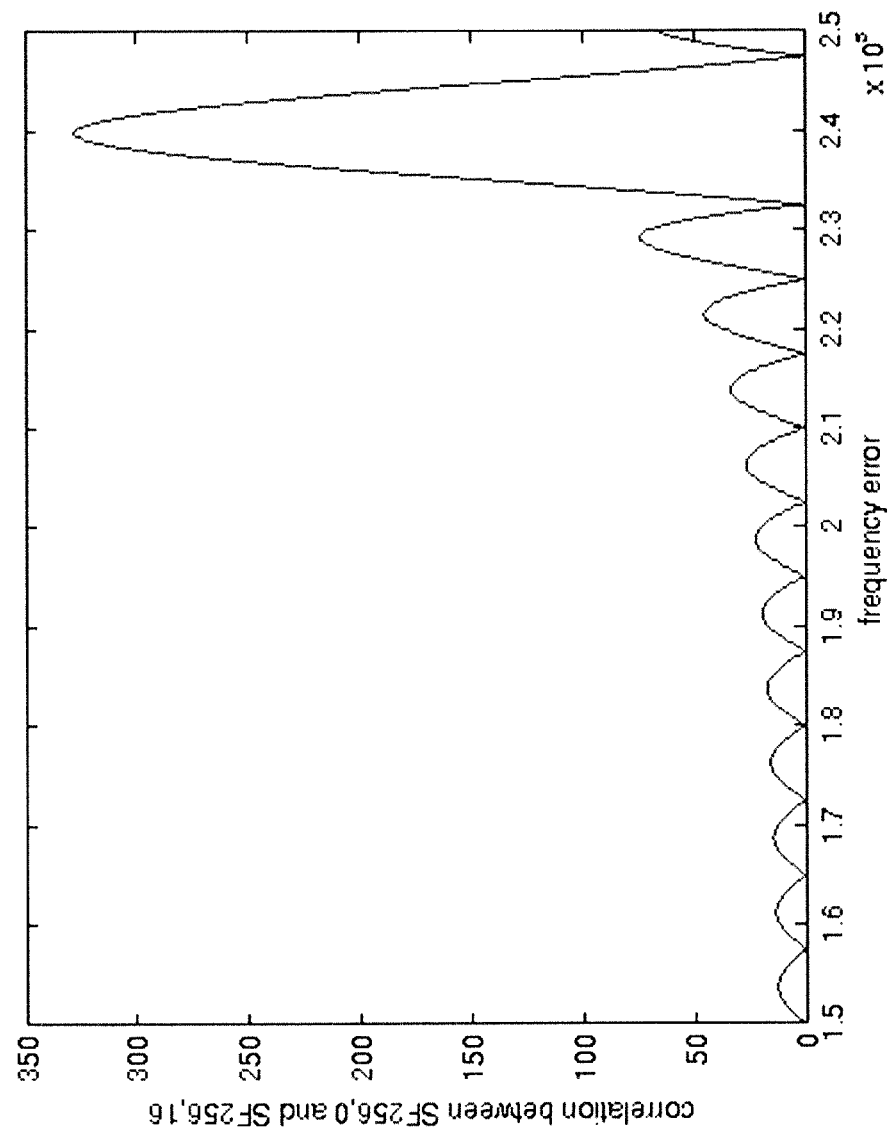
FIGS. 1a, 1b are schematic signal diagrams.

Embodiments will be exemplified in the following non-limiting description.

When used herein, the terms "cell" and "base station" may be used interchangeably.

When used herein, the terms "channel" and "signal" may be used interchangeably.

When used herein, the terms "User equipment (UE)" and "receiver" may be used interchangeably.

Embodiments herein relates to a procedure for cell search, and in particular initial cell-search.

A cell search procedure considered in embodiments herein comprises the following steps 1-4:

1. A Received Signal Strength Indicator (RSSI) scan finds energy on certain carriers based on a threshold.

2. Cell-search is run to find slot synchronization, frame synchronization and to find candidate scrambling code numbers for further evaluation. A typical cell-search procedure consists of three stages 1-3, see Annex C from 3GPPP TS 25.214:

Stage 1: Slot Synchronisation

During the first stage of the cell search procedure the UE uses the Synchronisation Channel's (SCH) primary synchronisation code to acquire slot synchronisation to a cell. This is typically done with a single matched filter (or any similar device) matched to the primary synchronisation code which is common to all cells. The slot timing of the cell can be obtained by detecting peaks in the matched filter output.

Stage 2: Frame Synchronisation and Code-Group Identification

During the second stage of the cell search procedure, the UE uses the Synchronisation Channel's (SCH) secondary synchronisation code to find frame synchronisation and identify the code group of the cell found in the first stage. This is typically done by correlating the received signal with all possible secondary synchronisation code sequences, and identifying the maximum correlation value. Since the cyclic shifts of the sequences are unique the code group as well as the frame synchronisation may be determined.

Stage 3: Scrambling-Code Identification

During the third and last stage of the cell search procedure, the UE determines the exact primary scrambling code used by the found cell. The primary scrambling code is typically identified through symbol-by-symbol correlation over the Common Pilot Channel (CPICH) with all codes within the code group identified in the second step. After the primary scrambling code has been identified, the Primary Common Control Physical Channel (CCPCH) can be detected. And the system- and cell specific Broadcast Channel (BCH) information can be read.

If the UE has received information about which scrambling codes to search for, stages 2 and 3 above can be simplified.

Because there could be a large frequency inaccuracy, the cell-search needs to scan through and correlate, assuming a range of hypothetical frequency errors on the received synchronization and pilot signals. Each stage of the cell-search procedure will correlate with different cyclic shifts to find the correct timing. In case there is a large frequency error, the correct timing may drift from one position to another during the time it takes to execute one of the stages. For this reason, each of the stages may need to anticipate the timing peak to be positioned within a range around the timing that was reported from the previous stage.

3. Measurements of RSSI and CPICH Received Signal Code Power (RSCP) are performed, and the received Energy per Chip/power density in the band, Ec/No=(RSCP/RSSI) is formed. It should be noted that even though the timing has been estimated in step 2, there may be an inaccuracy in this estimate. The measurements may therefore be performed assuming several timing hypothesis around the most probable timing estimated in step 2.

4. Ec/No is compared with a threshold. If Ec/No is above the threshold then the cell is classified as OK. The sequence stops and does not evaluate more options.

False cells, herein also referred to as ghost cells, can be found quite often. This may be depending on temperature. For example, ghost cells may be found at ±3600 kHz, and at ±200 kHz. This can happen both at high temperature and at room temperature.

Also at 3.84 MHz (19 carriers+40 kHz) from an existing cell a ghost cell can be seen. This ghost cell is a mirror of the existing cell cross-correlated with the 3.84 MHz chip clock.

False cells at 1 carrier distance from the existing cell, and at 1 carrier distance from the false cell 3.84 MHz away, may also be detected.

The ghost cells, e.g. the ghost cells at 1 carrier offset and at other offsets, from the "true" cell typically have the same scrambling code as the existing cell.

Figure 1B:
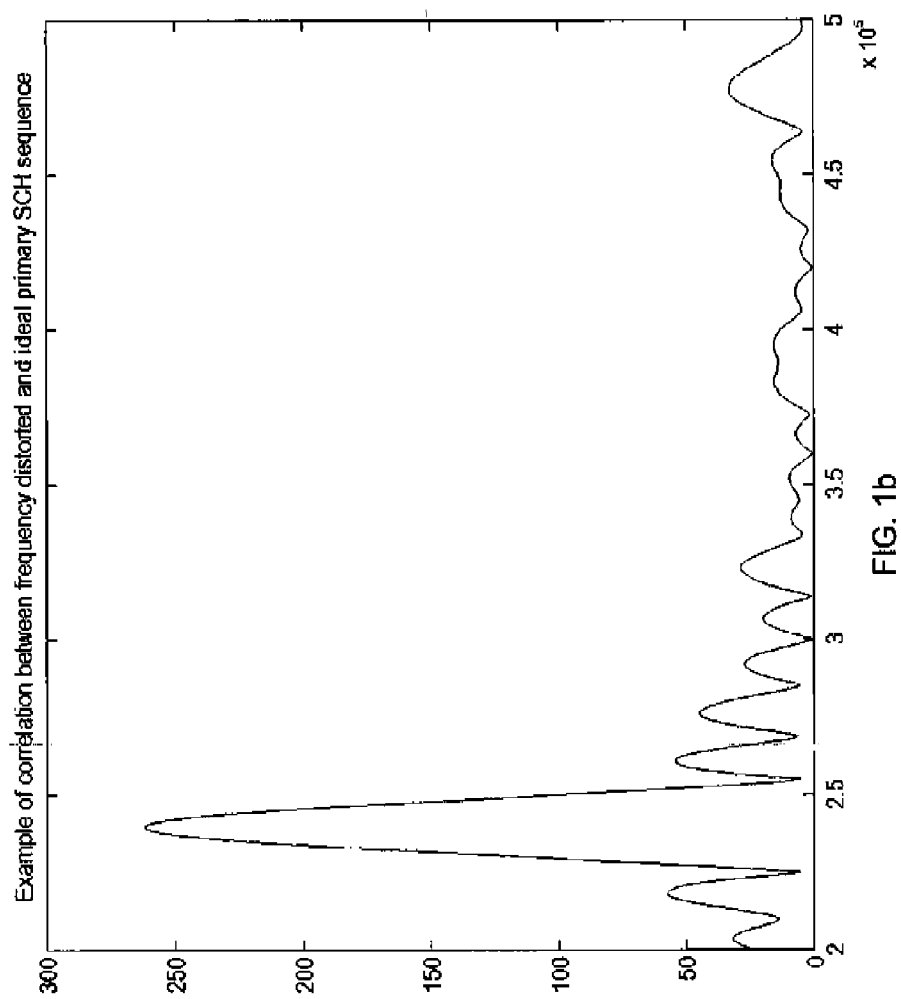

It has been realized that these cells are, in a typical scenario, due to a cross-correlation between channelization code SF256,16, which is used by the PICH (paging indicator channel) when the frequency offset is 240 kHz and the CPICH (common pilot channel). An example of such correlation can be found in FIG. 1a. At the same time the primary and secondary synchronization channels (P-SCH and S-SCH) may have an autocorrelation also at 240 kHz and a 1 chip timing offset. An example of such a correlation peak can be seen in FIG. 1b.

It should be noted that there may be other causes for ghost cells than those exemplified above.

Note that the scrambling code does not need to exhibit high correlation including frequency error since correlation can be written mathematically as:

$$\mathrm{Corr} = \sum_{i=0}^{SF} C_{scr} \cdot C_{cc16} \cdot e^{j2\pi f_e t} \cdot (C_{scr} \cdot C_{cc0})^* = \sum_{i=0}^{SF} C_{scr} \cdot C_{cc16} \cdot e^{j2\pi f_e t} \cdot C_{cc0}^* \cdot C_{scr}^*,$$

wherein SF is the spreading factor, $C_{scr}$, $C_{cc16}$, $C_{cc0}$, are the scrambling and spreading sequences, $f_e$ is the frequency error and * denotes complex conjugate.

As can be seen the correlation is high as long as the inner product of $C_{cc16} \cdot e^{j2\pi f t} \cdot C_{cc0}$, (depicted in FIG. 1a), is high for a certain $f_e$.

Note further that in order for the correlation to be high, the transmitted symbol sequence on the two channelization codes needs to be similar. This is likely to happen e.g. when PICH is transmitted on the second channelization code, while no UE is paged.

Thereby the PICH can be detected as a common pilot channel by the normal initial cell search but with 1 chip offset between the detected synchronization channel and the detected common pilot channel.

The crosscorrelation of CPICH and PICH and simultaneous autocorrelation for the SCH channels gives ghost cells at:

F=f0+/−240 kHz, where f0 is the carrier frequency of the cell

The ghost cells generated by the chip clock has the frequency F=f0+/−3840 kHz

Finally, the combination of the chip clock and the cross-correlation of CPICH and PICH channels and the autocorrelation of the synchronization channels gives ghost cells at F=f0+/−3600 kHz
And
F=f0+/−4080 kHz One should note that there may be other combinations of spreading codes and frequency offsets that correlate with CPICH.

Since the carrier grid is 200 kHz, the ghost cells that are not placed on the 200 kHz grid will only be detected at initial cell search when the frequency inaccuracy is large. The cells that are up to 40 kHz from the grid may be detected due to high frequency inaccuracy in this state. This means that the ghost cells 240 kHz from the carrier may be detected when searching 1 carrier from the cell. The ghost cells 3600 kHz from the cell is exactly 18 carriers from the true cell, and the ghost cell 3840 kHz from the cell is 40 kHz from the carrier 19*200 kHz from the carrier of the cell. These can all be found in the initial cell search.

The ghost cell that exists 4080 kHz from the cell will typically never be found (except potentially for the additional carriers in 3GPP) because it is 80 kHz from a carrier.

When a ghost cell is found the UE will try to read the BCH which does not exist. A problem with that is that it takes time to try to read the BCH. A more serious problem is that if a cell is detected on that carrier the frequency control may tune the receiver frequency to the erroneous frequency, assuming it is on the 200 kHz carrier. After that there is a risk, based on that the UE knows the frequency, that the UE will search at erroneous frequencies thereafter and will not find any other cells during future searches.

In order to avoid these and other problems (e.g. getting stuck on a ghost cell), the following is proposed.

1) Identify combinations of channelization codes and frequency offsets that correlate with the CPICH, at different timing offsets. Denote the combinations of frequency offsets and timing offsets (pairs of values) that give a high correlation as the set S1. The identification may be performed by offline analysis. The set S1 may be stored.

2) Identify the frequency offsets and timing offsets where the autocorrelation of SCH is high. Note that the SCH consists of P-SCH and S-SCH, where the exact S-SCH signal depends on the scrambling code group used for the particular cell that is being evaluated. This in turn means that the autocorrelation properties may depend on the scrambling code group used for the particular cell that is being evaluated. Denote the combinations of frequency offsets and timing offsets (pairs of values) that give a high correlation as the set S2. The identification may be performed by offline analysis. The set S2 may be stored.

3) Define a set S3 as the set of pairs of values, for which the frequency offset was occurring in both S1 and S2. The identification may be performed by offline analysis. The set S3 may be stored.

The following steps may be part of a cell search process, and may, for example, be performed each time a cell is detected in the cell search process, e.g. in the initial cell search process.

4) When a cell is detected, but before BCH is read
 a. Search exactly at the frequency offsets contained in the set S3, (e.g. +/−240 kHz, +/−3.6 MHz and 3.84 MHz), for other cells. These additional searches performed could either consist of a complete cell-search according to steps 1-4 above, or through a simplified alternative method, where steps 1-2 are omitted, and only steps 3-4 are performed on each of the offsets in the set S3. In some embodiments, the additional search is conducted only at the combination of scrambling codes and/or channelization codes (and optionally timing offsets) of the detected cell and the frequency offsets of S3.
 b. If cells on these offsets are found in the additional searches there are different options
  i. Select the cell, from the set of the first detected cells and the cells found on the predefined offsets in the additional search, which have the largest RSCP, or
  ii. Consider an alternative, where the timing estimate obtained from cell search stage 2, which is based on correlation of SCH, is compared with the timing estimate from either cell search stage 3, or the above step 3, which is based on correlation of CPICH. Knowing that timing estimates from the two correlations (CPICH and SCH) should be the same when using the correct frequency offset, any cells with non-zero difference may be discarded from further evaluation. Then select the cell, from the remaining set of cells, which have the largest RSCP.

5) Read the BCH of the selected cell
6) Decide that a cell is detected!
7) Optionally, add the detected ghost cells to a "ghost cell" list to be excluded from future cell-search candidate evaluation.

Figure 1C:
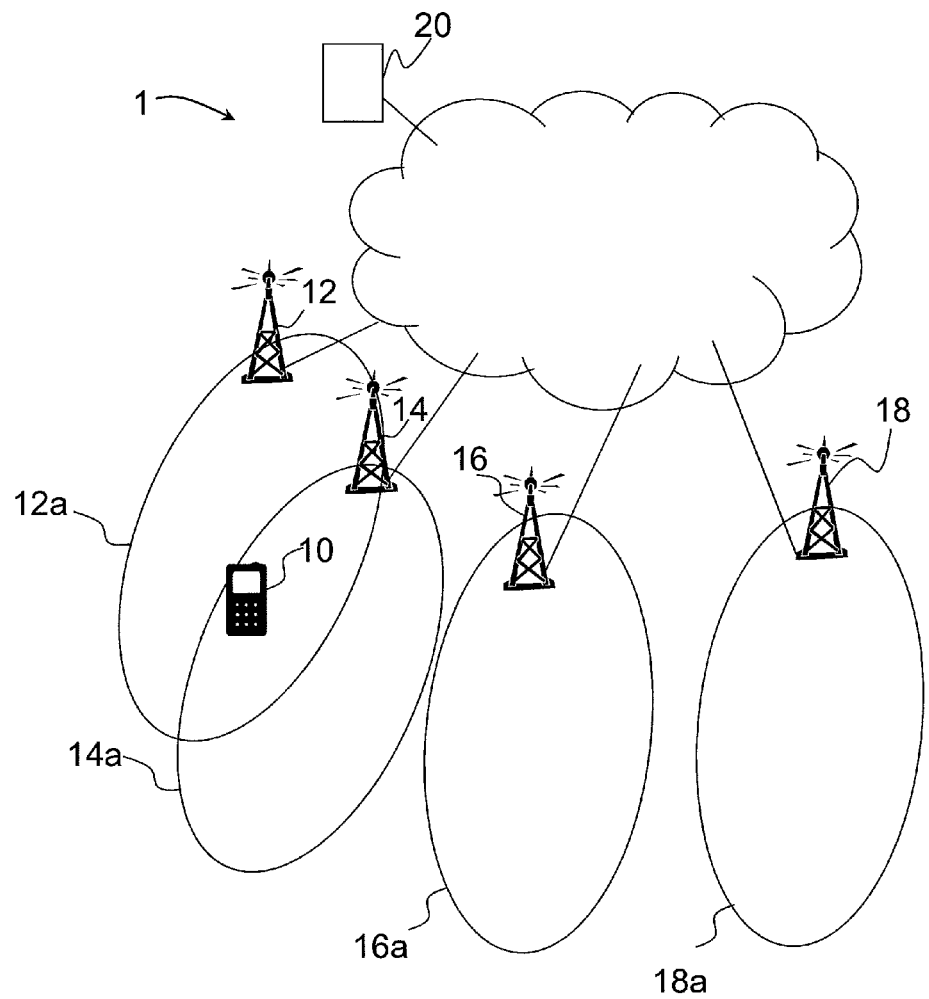
FIG. 1c is a schematic block diagram illustrating embodiments of a communications network.

FIG. 1c schematically illustrates a communications network 1 comprising a receiver 10. The communications network 1 may be a radio communications network such as a 3rd Generation Partnership Project (3GPP) communications network or a non-3GPP communications network. The receiver 10 may be comprised in a communication device such as a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. A number of other receivers, not shown, may also be located within the communications network 1.

The communications network 1 comprises further a plurality of base stations 12, 14, 16, 18. Each of which base station 12, 14, 16, 16 provides radio coverage over at least one geographic area forming a cell 12a, 14a, 16a, 18a. The base station 12, 14, 16, 18 is configured to serve a communication device located within the cell 12a, 14a, 16a, 18a.

The base station 12, 14, 16, 18 may be an eNB, eNodeB, or a Home Node B, a Home eNode B, a GSM/EDGE radio base station or any other network unit capable to serve a user equipment in a cellular communications network.

The communication device transmits data over a radio interface to a base station 12, 14, 16, 18 in an uplink (UL) transmission and the base station 12, 14, 16, 18 transmits data to the communication device in a downlink (DL) transmission.

Further, the communications network 1 comprises a computerized device 20, which will be described in more detail below.

Figure 2:
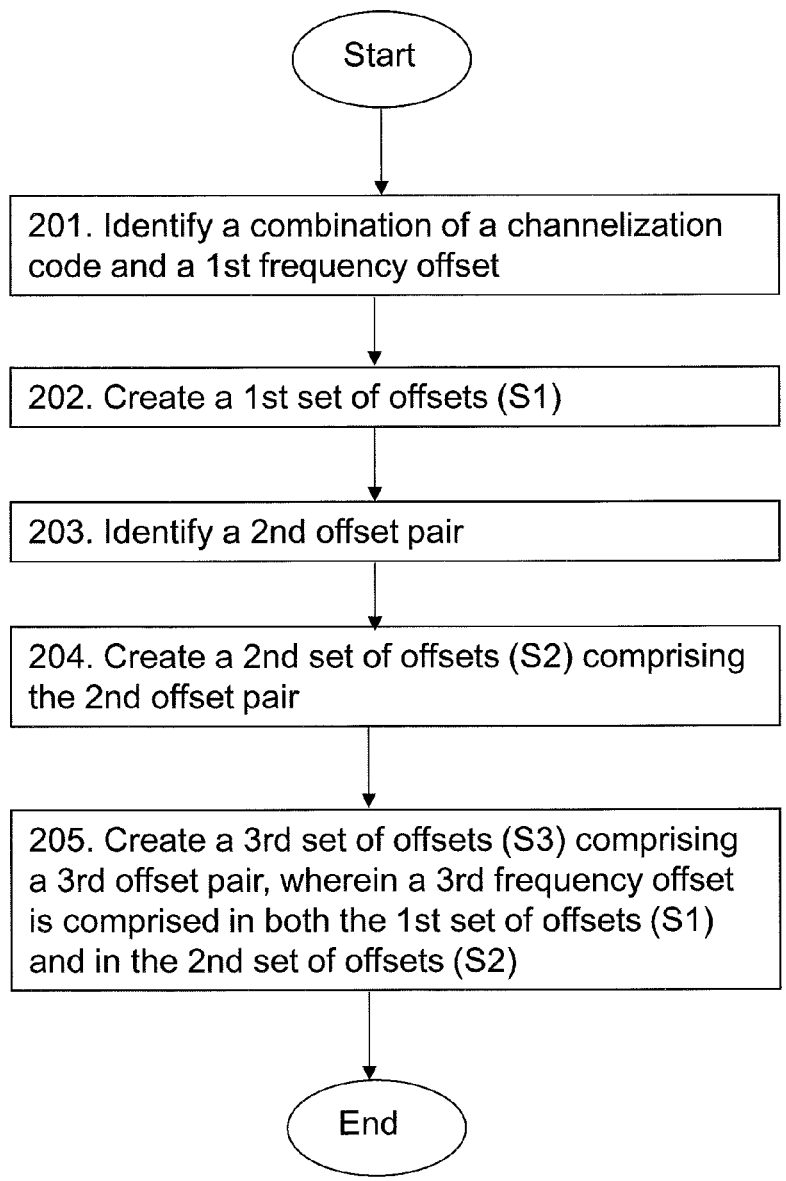
FIG. 2 a flowchart depicting embodiments of a method in a computerized device.

Actions in the computerized device 20 for assisting a receiver 10 in initial cell search to find a true (i.e. an actual) base station having a carrier frequency in the radio communications network 1, will now be described with reference to FIG. 2. The actions do not have to be performed in the order stated below, but may be taken in any suitable order. Further, actions may be combined.

In other embodiments, the computerized device is not comprised in, or even associated with, the network. For example, it may be a device or module used in the production of a receiver or user equipment, or it may be associated with, or comprised in, the receiver or user equipment itself. Many other variations of embodiments of the computerized device are possible.

Action 201

The computerized device 20 identifies at least one combination of a channelization code and a first frequency offset, which at least one combination is associated with at least one signal, which at least one signal, at a first timing offset, has a correlation with a reference signal above a first threshold value.

In some embodiments, the reference signal is a Common Pilot Channel, CPICH, signal.

The first threshold value may be a predetermined threshold value and/or an adaptive threshold value.

Action 202

For at least one first offset pair comprising the first frequency offset and the first timing offset, the computerized device 20 creates a first set of offsets S1 comprising the at least one first offset pair. Thus, for at least one first offset pair comprising the first frequency offset and the first timing offset, which offsets are associated with the at least one signal having a correlation with the reference signal above the first threshold value, as mentioned in Action 201, the computerized device 20 creates a first set of offsets S1 comprising the at least one first offset pair.

Figure 6A:
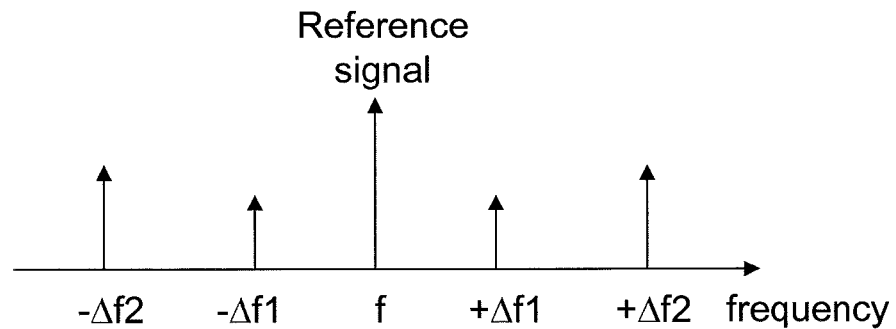
FIGS. 6a, 6b are schematic signal diagrams.

FIG. 6a schematically illustrates a signal diagram for a reference signal having a peak (typically a true cell) at a frequency f. FIG. 6a also illustrates correlation peaks at the frequency offsets $-\Delta f2$, $-\Delta f1$, $+\Delta f1$, and $+\Delta f2$. For those correlation peaks that are above the first threshold value, the corresponding frequency offsets will be comprised in the first set of offsets S1 together with their respective timing offset. Thus, if all of the correlation peaks are above the first threshold value, all of the frequency offsets $-\Delta f2$, $-\Delta f1$, $+\Delta f1$, and $+\Delta f2$ will be comprised in the first set of offsets S1. If only the correlations peaks at the frequency offsets $-\Delta f2$, and $+\Delta f2$ are above the first threshold value, only the frequency offsets $-\Delta f2$, and $+\Delta f2$ will be comprised in the first set of offsets S1. However, in this description it will be assumed that all the correlation peaks are above the first threshold value, and that the first set of offsets S1 comprises all of the frequency offsets $-\Delta f2$, $-\Delta f1$, $+\Delta f1$, and $+\Delta f2$.

Action 203

The computerized device 20 identifies at least one second offset pair comprising a second frequency offset and a second timing offset, which at least one second offset pair gives an autocorrelation of a synchronization signal that is above a second threshold value.

In some embodiments, the synchronization signal is a Synchronization Channel, SCH, signal (e.g. S-SCH and/or P-SCH).

The second threshold value may be a predetermined threshold value and/or an adaptive threshold value.

Action 204

The computerized device 20 creates a second set of offsets S2 comprising the at least one second offset pair.

Figure 6B:
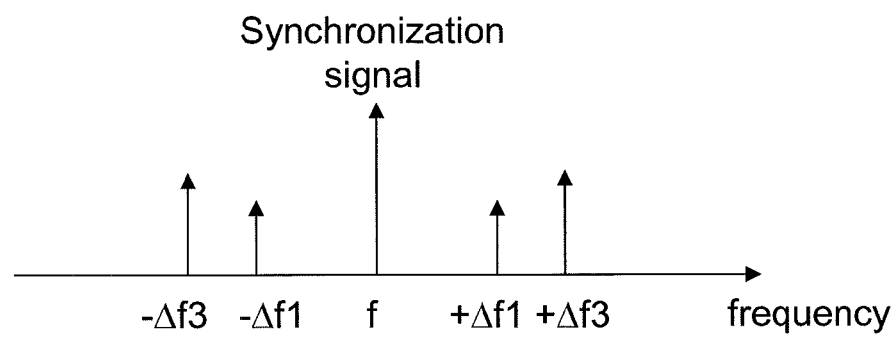

FIG. 6b schematically illustrates a signal diagram for a synchronization signal having a peak (typically a true cell) at a frequency f. FIG. 6b also illustrates correlation peaks at the frequency offsets $-\Delta f3$, $-\Delta f1$, $+\Delta f1$, and $+\Delta f3$. For those correlation peaks that are above the second threshold value, the corresponding frequency offsets will be comprised in the second set of offsets S2 together with their respective timing offset. Thus, if all of the correlation peaks are above the second threshold value, all of the frequency offsets $-\Delta f3$, $-\Delta f1$, $+\Delta f1$, and $+\Delta f3$ will be comprised in the second set of offsets S2. If only the correlations peaks at the frequency offsets $-\Delta f3$, and $+\Delta f3$ are above the second threshold value, only the frequency offsets $-\Delta f3$, and $+\Delta f3$ will be comprised in the second set of offsets S2. However, in this description it will be assumed that all the correlation peaks are above the second threshold value, and that the second set of offsets S2 comprises all of the frequency offsets $-\Delta f3$, $-\Delta f1$, $+\Delta f1$, and $+\Delta f3$.

Action 205

The computerized device 20 creates a third set of offsets S3 comprising at least one third offset pair, which at least one offset pair comprises a third frequency offset and a third timing offset, wherein the third frequency offset is comprised in both the first set of offsets S1 and the second set of offsets S2.

With reference to FIGS. 6a and 6b and to our assumption that the first set of offsets S1 comprises all of the frequency offsets $-\Delta f2$, $-\Delta f1$, $+\Delta f1$, and $+\Delta f2$ and that the second set of offsets S2 comprises all of the frequency offsets $-\Delta f3$, $-\Delta f1$, $+\Delta f1$, and $+\Delta f3$, the third set of offsets S3 will comprise the frequency offset $-\Delta f1$ and $+\Delta f1$, and their respective timing offset.

The identification of the sets S1 and S2 may be interchanged in some embodiments.

In some embodiments, the identification of action 203 is only performed for frequency and time offset pairs that are already in the set S1. In such an embodiment, the set S3 is obtained directly as a result of action 204, and action 205 is superfluous.

In some embodiments (when S2 is formed first), the identification of action 201 is only performed for frequency and time offset pairs that are already in the set S2. In such an embodiment, the set S3 is obtained directly as a result of action 202, and action 205 is superfluous.

In some embodiments, actions 201 and 203 may be combined. In such embodiments, the combined action 201, 203 comprises identifying at least one offset pair, relating to the carrier frequency, comprising a frequency offset and a timing offset, wherein a correlation signal of frequency components of the receiver and/or the radio communications network exceeds a threshold.

Further, in some embodiments, actions 202, 204, and 205 may be combined. In such embodiments, the combined action 202, 204, 205 comprises creating a set of offsets S3 comprising the at least one offset pair, wherein the set of offsets S3 is to be used in cell search to find the actual base station in the radio communications network 1.

The frequency components of the receiver 10 may comprise a receiver chip clock, and the frequency components of the radio communications network 1 may comprise one or more of a channelization code; a scrambling code; a reference signal; a synchronization signal; and a paging indicator signal.

Thus, in some embodiments, a set or a list of hypothetical frequency offsets is created after having simultaneously found correlation peaks on the WCDMA P-SCH and S-SCH as well as having found a cell for which the measured cell quality exceeds a threshold. The simultaneous correlation peaks need to occur for three different signals, including thresholding of the third signal to avoid noise peaks. The selection of best hypothesis is then based on the cell quality measurement.

This is different from the method of US 2011/0103534, which method identifies hypothetical ghost cell frequencies based on the LTE PSS signal only. For the case of handling ghost cells in LTE, more than one signal, i.e. more than the PSS, would not be used to validate the first cell found, since the characteristics of the LTE synchronization signals are such that only the PSS detection shows spurious correlation peaks at ghost frequencies. As mentioned above this is utilized in US 2011/0103534, to select the correct hypothesis from the candidates that were generated.

Figure 3:
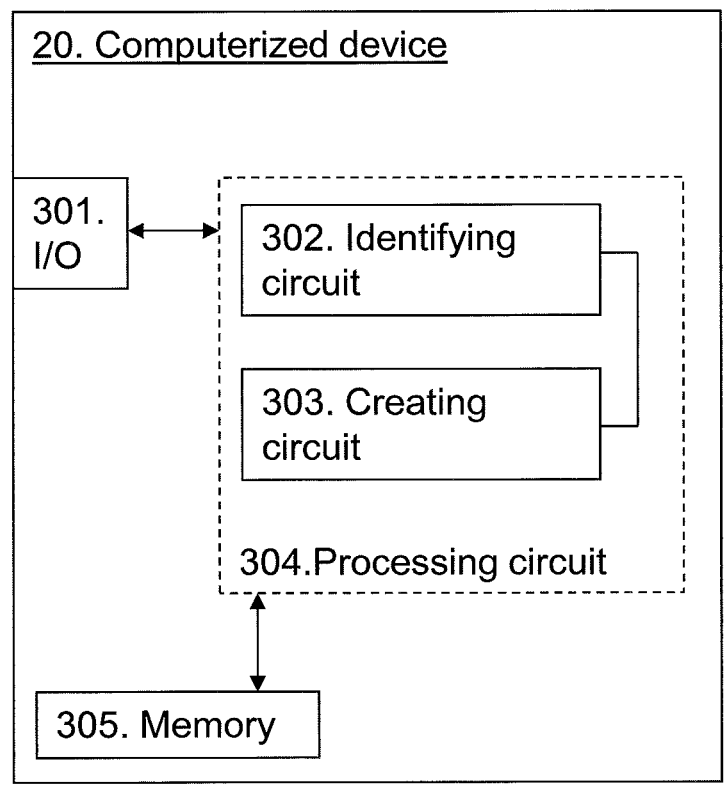
FIG. 3 is a schematic block diagram illustrating embodiments of a computerized device.

To perform the method actions in the computerized device 20 described above for assisting a receiver 10 in initial cell search to find a true (i.e. an actual) base station having a carrier frequency in the radio communications network 1, the computerized device 20 comprises the following arrangement depicted in FIG. 3.

The computerized device 20 may, in some embodiments, comprise an input and output port 301 configured to function as an interface for communication between e.g. the computerized device 20 and the communications network 1 and/or the computerized device 20 and the receiver 10.

The computerized device 20 comprises further an identifying circuit 302. The identifying circuit 302 is configured to identify at least one offset pair, relating to the carrier frequency, comprising a frequency offset and a timing offset, wherein a correlation signal of frequency components of the receiver and/or the radio communications network exceeds a threshold.

The frequency components of the receiver 10 may comprise a receiver chip clock, and the frequency components of the radio communications network 1 may comprise one or more of a channelization code; a scrambling code; a reference signal; a synchronization signal; and a paging indicator signal.

In some embodiments, the identifying circuit 302 is configured to identify at least one combination of a channelization code and a first frequency offset. The at least one combination is associated with at least one signal, which at least one signal, at a first timing offset, has a correlation with a reference signal above a first threshold value. The reference signal may be a Common Pilot Channel, CPICH, signal.

The identifying circuit 302 is further configured to identity at least one second offset pair comprising a second frequency offset and a second timing offset. The at least one second offset pair gives an autocorrelation of a synchronization signal that is above a second threshold value. The synchronization signal may be a Synchronization Channel, SCH, signal.

In some embodiments, the first and second threshold values are predetermined threshold values and/or adaptive threshold values.

Further, the computerized device 20 comprises a creating circuit 303. The creating circuit 303 is configured to create a set of offsets S3 comprising the at least one offset pair, relating to the carrier frequency, comprising a frequency offset and a timing offset, wherein a correlation signal of frequency components of the receiver and/or the radio communications network exceeds a threshold. The set of offsets S3 is to be used in cell search to find the actual base station in the radio communications network 1.

In some embodiments, the creating circuit 303 is configured to create the first set of offsets S1. As previously mentioned, the first set of offsets S1 comprises at least one first offset pair, which at least one first offset pair comprises the first frequency offset and the first timing offset associated with the at least one signal.

The creating circuit 303 may further be configured to create the second set of offsets S2. As previously mentioned, the second set of offsets S2 comprises the at least one second offset pair.

Furthermore, the creating circuit 303 is configured to create the third set of offsets S3. As previously mentioned, the third set of offsets S3 comprises at least one third offset pair comprising a third frequency offset and a third timing offset, wherein the third frequency offset is comprised in both the first set of offsets S1 and the second set of offsets S2.

The third set of offsets S3 is to be used in initial cell search to find the true base station in the radio communications network 1.

The creating circuit 303 may be configured to store the third set of offsets S3 on a memory 305, which will be described below. The memory for storing S3 may be comprised in the receiver 10 according to some embodiments.

In some embodiments, the computerized device 20, by means of e.g. the creating circuit 303 and the input/output port 301, is configured to transfer the third set of offsets S3 to the receiver 10 over for example the communications network 1. However, it should be understood that the computerized device 20 may alternatively be comprised in the receiver 10 or connected to the receiver 10 (permanently or temporarily—e.g. during a production stage). For example, both the receiver 10 and the computerized device 20 may be comprised in a communications device.

Embodiments herein for assisting a receiver 10 in initial cell search to find a true (i.e. an actual) base station having a carrier frequency in the radio communications network 1 may be implemented through one or more processors, e.g. microprocessor, such as a processing circuit 304 comprised in the computerized device 20 depicted in FIG. 3, together with computer program code for performing the functions and/or method actions of embodiments herein.

The computerized device 20 may further comprise a memory 305. The memory may comprise one or more memory units and may be used to store e.g. the first set of offsets S1, the second set of offsets S2, the third set of offsets S3, and/or threshold values such as the first, second, and/or third threshold values.

Figure 4:
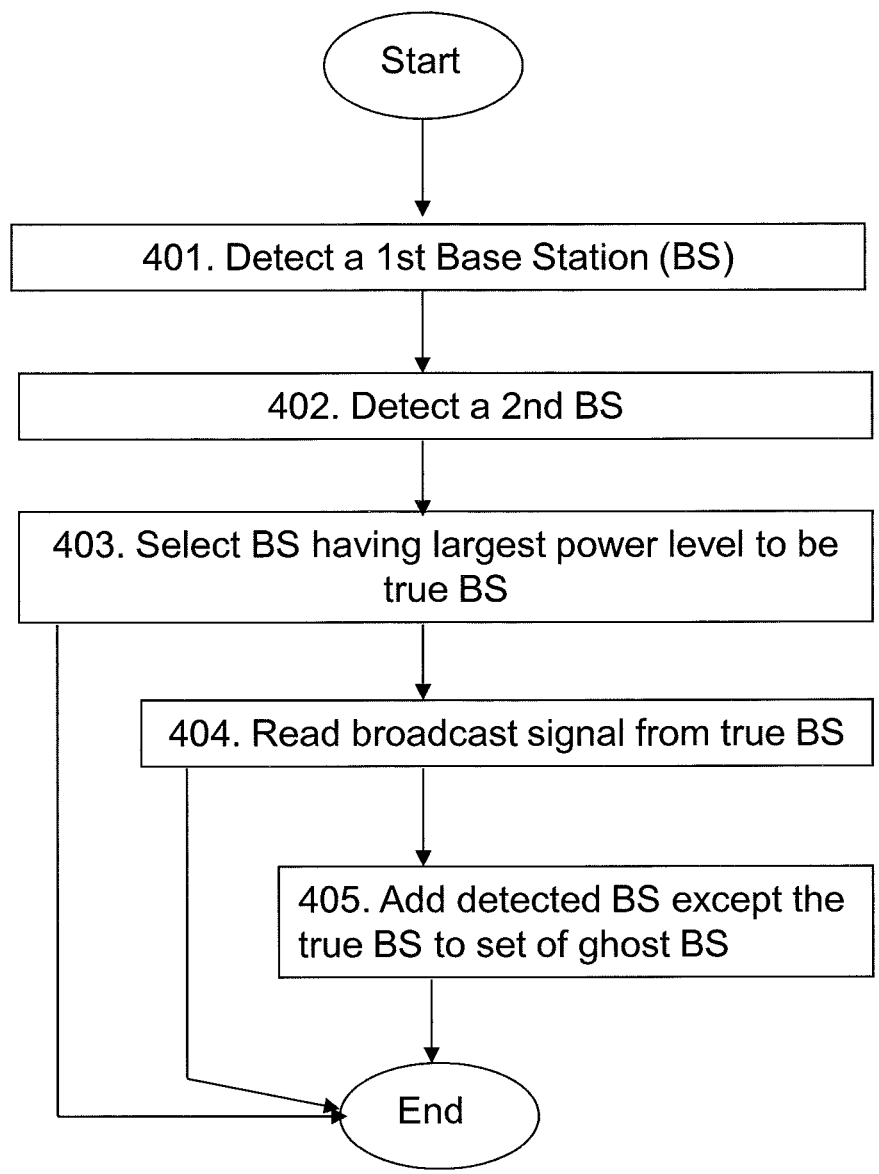
FIG. 4 is a flowchart depicting embodiments of a method in a receiver.

Actions in the receiver 10 for initial cell search to find a true (i.e. an actual) base station having a carrier frequency in a radio communications network 1, will now be described with reference to FIG. 4. As previously mentioned, the communications network 1 comprises the receiver 10 and a plurality of base stations 12, 14, 16, 18, each of which base stations 12, 14, 16, 18 provides radio coverage of at least one geographical area forming a cell 12a, 14a, 16a, 18a. The actions do not have to be performed in the order stated below, but may be taken in any suitable order. Further, actions may be combined.

Action 401

The receiver 10 detects a first base station. At this point, there is no knowledge whether this is a true base station or a ghost base station. The receiver 10 may detect the first base station by conventional or future methods, e.g. by receiving a reference signal, such as a CPICH or a SCH signal.

This action relates to steps 1, 2 and 3 of the cell search procedure described above.

Action 402

When at least one first base station is detected, the receiver 10 detects at least one second base station at at least one frequency offset comprised in a third set of offsets S3.

At this point, there is no knowledge whether these are true base stations or ghost base stations.

As previously mentioned, the set of offsets S3 comprises at least one offset pair comprising a frequency offset and a timing offset, for which a correlation signal of frequency components of the receiver and/or the radio communications network exceeds a threshold.

The frequency components of the receiver 10 may comprise a receiver chip clock, and the frequency components of the radio communications network 1 may comprise one or more of a channelization code, a scrambling code, a reference signal, a synchronization signal, and a paging indicator signal.

In some embodiments, the set of offsets S3 is a third set of offsets S3 comprising at least one third offset pair comprising a third frequency offset and a third timing offset, wherein the third frequency offset is comprised in both a first set of offsets S1 and a second set of offsets S2.

The first set of offsets S1 comprises at least a first offset pair comprising a first frequency offset and a first timing offset which first offset pair is associated with a signal that has a correlation with a reference signal above a first threshold value, and in The second set of offsets S2 comprises at least a second offset pair comprising a second frequency offset and a second timing offset which at least one second offset pair gives an autocorrelation of a synchronization signal that is above a second threshold value.

In some embodiments, the receiver 10 detects the at least one second base station by, for each third frequency offset, performing measurements on total received signal power of a frequency carrier and on received signal power of a reference signal transmitted from a base station. When the received signal power of the reference signal divided with the total received signal power of the frequency carrier is above a third threshold value, the receiver 10 detects the second base station. This relates to cell-search steps 3 and 4 described above.

The measurement on total received signal power of a frequency carrier may be a measurement on Received Signal Strength Indicator (RSSI).

Further, the measurement on received signal power may be a measurement on Received Signal Code Power (RSCP) of a reference signal. As previously mentioned, the reference signal may be a CPICH signal.

In some embodiments, the receiver 10 detects the at least one second base station by performing a signal strength measurement to find frequencies having a signal power above a fourth threshold value, performing slot synchronization, performing frame synchronization and code-group identification, and performing scrambling-code identification. This relates to cell-search steps 1, 2 and 3 described above.

The fourth threshold value may be a predetermined threshold value and/or an adaptive threshold value.

In some embodiments, the receiver 10 performs the frame synchronization and code-group identification, by obtaining a first timing estimate relating a synchronization signal. Further, the receiver 10 may perform scrambling-code identification by obtaining a second timing estimate relating to the reference signal. In such embodiments, the receiver may compare the first and second timing estimates, and classify a base station for which the first estimated timing offset is equal to the second estimated timing offset as a detected second base station. In other words, if the first and second timing offsets are not equal, the signals are a result of correlation and relate to a non-existing base station. The non-existing base station is herein also referred to as a ghost base station.

Action 403

When at least one second base station is detected, the receiver 10 selects one base station 12, 14, 16, 18 having the largest received signal power level to be the true (i.e. the actual) base station. The received signal power level may be a Received Signal Code Power (RSCP) level.

In some embodiments, the receiver 10 selects the base station 12, 14, 16, 18 from a set of first detected base stations and a set of second base stations detected at one or more of the third frequency offsets comprised in the third set of offsets S3.

This action relates to step 4 of the cell search procedure.

Action 404

When a true base station 12, 14, 16, 18 has been detected, the receiver 10 may read a broadcast signal received from the true base station.

The broadcast signal may be a Broadcast Channel (BCH) signal.

Action 405

Optionally, the receiver 10 may add the first and second base stations except the true base station, i.e. the non-existing base stations, to a set of ghost base stations to be excluded from future (subsequent) base station evaluation. The set of ghost base stations may be a list of ghost base stations.

In the list, each set of non-existing base stations may be associated with a respective carrier frequency (i.e. corresponding to a true base station carrier).

The set of ghost base stations may, for example, be used after Action 401 when a first base station has been detected.

In some embodiments, it may be determined based on the list whether or not the first base station is comprised in the set of ghost base stations.

If the first base station is not comprised in the set of ghost base stations and is not indicated as a true carrier either in the list, the process as described above may be executed in its entirety.

If the first base station is comprised (once or more than once) in the set of ghost base stations and is not indicated as a true carrier in the list, the first base station is typically non-existing, and the receiver 10 should exclude it from consideration. Furthermore, it may be concluded that the corresponding true carrier(s) in the list are good candidate(s) for finding a cell.

If the first base station is comprised (once or more than once) in the set of ghost base stations and is also indicated as a true carrier in the list, it cannot be concluded directly if the first base station is typically non-existing or true. Thus, the receiver 10 should not exclude it from consideration. Good candidates for finding a cell thus include the first base station and the true carrier(s) corresponding to the indication(s) of the first base station as a ghost cell in the list.

In some embodiments, it may be determined based on the list what the corresponding ghost cells are, assuming that the first base station is a true carrier. In such embodiments, action 402 may be limited based on that assumption.

Figure 5:
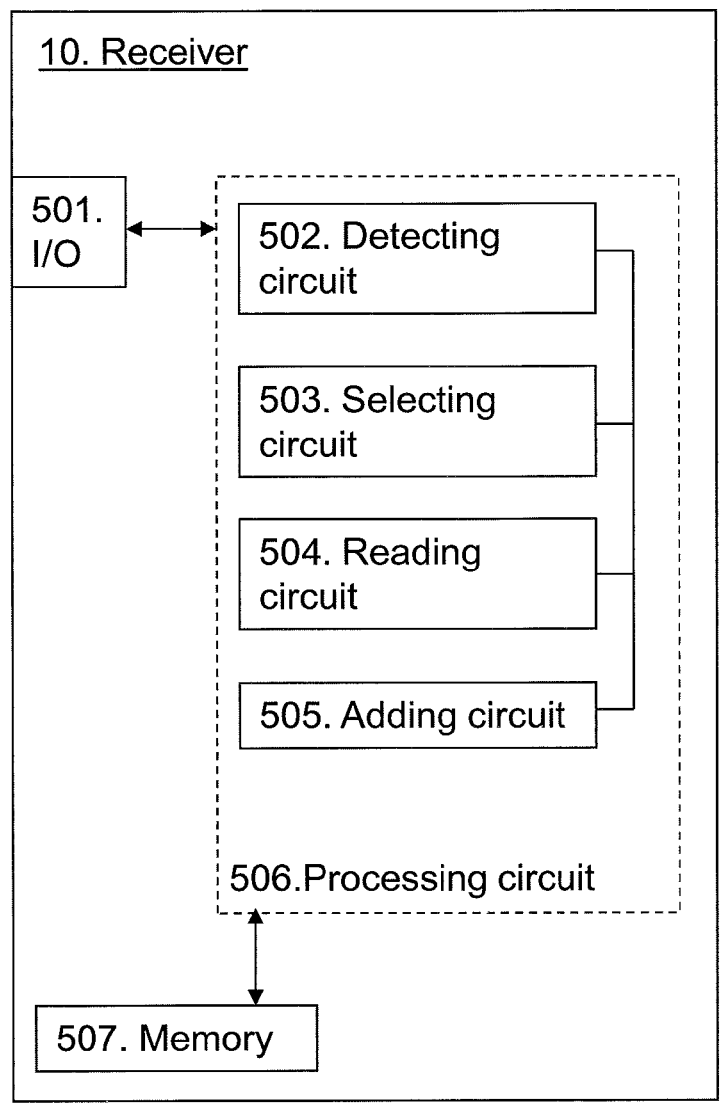
FIG. 5 is a schematic block diagram illustrating embodiments of a receiver.

To perform the method actions in the receiver 10 for initial cell search to find a true (i.e. an actual) base station having a carrier frequency in a radio communications network 1, the receiver 10 comprises the following arrangement depicted in FIG. 5. As previously mentioned, the communications network 1 comprises the receiver 10 and a plurality of base stations 12, 14, 16, 18, each of which base stations 12, 14, 16, 18 provides radio coverage of at least one geographical area forming a cell 12a, 14a, 16a, 18a.

The receiver 10 comprises an input and output port 501 configured to function as an interface for communication between e.g. the receiver 10 and the communications network 1.

Further, the receiver 10 comprises a detecting circuit 502 configured to detect a first base station by receiving a reference signal. The detecting circuit 502 is further configured to detect at least one second base station at each frequency offset comprised in a set of offsets S3, when the at least one first base station has been detected.

At this stage, it is not known whether or not the at least one first base station is an existing base station or a non-existing base station. The same holds true for the one or more second base stations.

As previously mentioned, the set of offsets S3 comprises at least one offset pair comprising a frequency offset and a timing offset, for which a correlation signal of frequency components of the receiver 10 and/or the radio communications network 1 exceeds a threshold.

The frequency components of the receiver 10 may comprise a receiver chip clock, and the frequency components of the radio communications network 1 may comprise one or more of a channelization code, a scrambling code, a reference signal, a synchronization signal, and a paging indicator signal As also previously mentioned, in some embodiments, the set of offsets S3 is a third set of offsets S3 comprising at least one third offset pair comprising a third frequency offset and a third timing offset, wherein the third frequency offset is comprised in both a first set of offsets S1 and in a second set of offsets S2.

The first set of offsets S1 comprises at least a first offset pair comprising a first frequency offset and a first timing offset which first offset pair is associated with a signal that has a correlation with a reference signal above a first threshold value.

The second set of offsets S2 comprises at least a second offset pair comprising a second frequency offset and a second timing offset which at least one second offset pair gives an autocorrelation of a synchronization signal that is above a second threshold value.

In some embodiments, the detecting circuit 502 is further configured to, for each third frequency offset, perform measurements on total received signal power of a frequency carrier and on received signal power of a reference signal transmitted from a base station and to detect the base station as a second base station 16, 18, when the received signal power of the reference signal divided with the total received signal power of the frequency carrier is above a third threshold value. This relates to cell search step 3 and 4 described above.

The measurement on total received signal power of a frequency carrier may be a measurement on Received Signal Strength Indicator (RSSI). Further, the measurement on received signal power may be a measurement on Received Signal Code Power (RSCP) of the reference signal. As previously mentioned, the reference signal may be a CPICH signal.

In some embodiments, the detecting circuit 502 is further configured to perform a signal power measurement to find frequencies having a signal power above a fourth threshold value. The detecting circuit 502 may further be configured to perform slot synchronization, frame synchronization and code-group identification, and scrambling-code identification. This relates to cell search step 1, 2 and 3 described above.

The fourth threshold value may be a predetermined threshold value and/or an adaptive threshold value.

In some embodiments, the detecting circuit 502 may further, when performing of frame synchronization and code-group identification, be configured to obtain a first timing estimate relating a synchronization signal. The detecting circuit 502 may further, when performing the scrambling-code identification, be configured to obtain a second timing estimate relating to the reference signal. In such embodiments, the detecting circuit 502 may further compare the first and second timing estimates, and classify a base station for which the first estimated timing offset is equal to the second estimated timing offset as a detected second base station. As previously mentioned, if the first and second timing offsets are not equal, the signals relate to correlation and a non-existing base station. The non-existing base station is herein also referred to as a ghost base station.

The receiver 10 comprises further a selecting circuit 503 configured to select one base station 12, 14, 16, 18 having the largest received signal power level to be the true (i.e. the actual) base station, when at least one second base station has been detected. The received signal power level may be a Received Signal Code Power (RSCP) level.

In some embodiments, the selecting circuit 503 is further configured to the select the base station 12, 14, 16, 18 from a set of first detected base stations and a set of second base stations detected at one or more of the third frequency offsets comprised in the third set of offsets S3.

The receiver 10 may further a reading circuit 504 configured to read a broadcast signal received from the true base station 12, 14, 16, 18.

In some embodiments, the receiver 10 comprises an adding circuit 505 configured to add the first and second base stations except the true base station 12, 14, 16, 18 to a set of ghost base stations to be excluded from further base station evaluation.

Embodiments herein for initial cell search to find a true (i.e. an actual) base station having a carrier frequency in a radio communications network 1 may be implemented through one or more processors, e.g. microprocessor, such as a processing circuit 506 comprised in the receiver 10 depicted in FIG. 5, together with computer program code for performing the functions and/or method actions of embodiments herein.

The receiver 10 may further comprise a memory 507. The memory 507 may comprise one or more memory units and may be used to store e.g. the third set of offsets S3 (and possibly the first set of offsets S1, the second set of offsets S2), and/or threshold values such as one or more the first, second, third and fourth threshold values.

Figure 7:
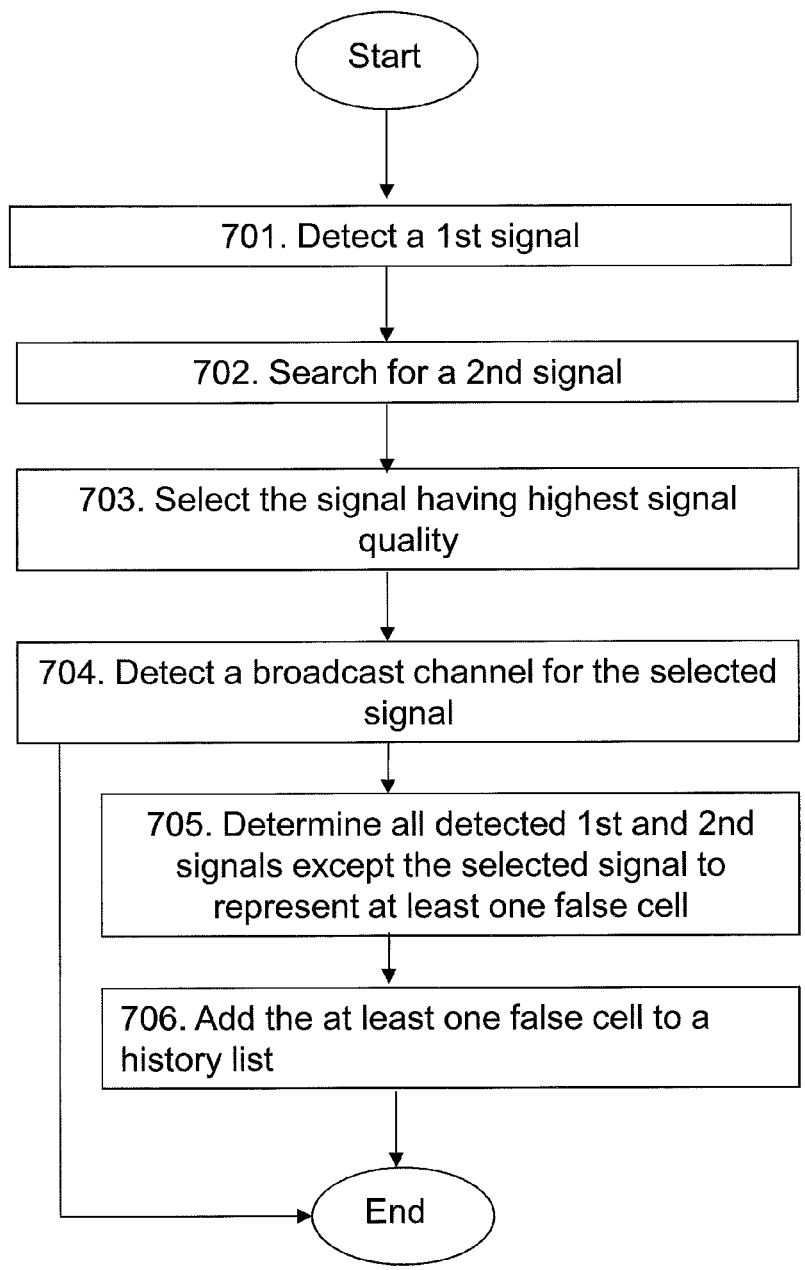
FIG. 7 is a flowchart depicting embodiments of a method in a receiver.

Actions in the receiver 10 for cell search to find an actual (i.e. a true) base station having a carrier frequency in a radio communications network 1, will now be described with reference to FIG. 7. As previously mentioned, the communications network 1 comprises the receiver 10 and a plurality of base stations 12, 14, 16, 18, each of which base stations 12, 14, 16, 18 provides radio coverage of at least one geographical area forming a cell 12a, 14a, 16a, 18a.

For example, the radio communication network 1 may be a WCDMA radio communication network.

The actions do not have to be performed in the order stated below, but may be taken in any suitable order. Further, actions may be combined.

Action 701

The receiver 10 detects a first signal representative of a base station 12, 14, 16, 18 by performing slot synchronisation, frame synchronization, cell identification, and by performing measurement of a signal quality of the first signal and comparing the measured signal quality with a first threshold value.

In order to perform the cell identification, the receiver 10 may perform base station scrambling code identification.

Action 702

When a first signal having a signal quality that is greater than the first threshold value has been detected, the receiver 10 searches for at least one second signal representative of a base station 12, 14, 16, 18 for at least one frequency offset comprised in a set of offsets S3.

In some embodiments wherein the radio communication network 1 is a WCDMA radio communication network and wherein the receiver 10 is a WCDMA receiver, the at least one frequency offset comprised in the set of offsets S3 is at least one of +/−240 kHz, +/−3600 kHz, +/−3840 kHz, and +/−4080 kHz.

In some embodiments, the receiver 10 may further perform slot synchronisation, frame synchronization, cell identification, and/or measurement of the signal quality of the at least one second signal.

However, it should be understood that in some other embodiments, the receiver may further only perform measurement of a signal quality of the second signal.

The measured signal quality of the at least one second signal may be compared with a second threshold value.

Further, the signal quality may be given by the received energy per chip divided by the power density in the band, Ec/No.

Action 703

When one or more second signals are detected, the receiver 10 selects the signal with the highest signal quality. The selected signal may be the first signal or the at least one second signal.

Action 704

The receiver 10 detects a broadcast radio channel representative of a base station for the selected signal. The broadcast channel may be a primary CCPCH or BCH.

Action 705

In some embodiments, the receiver 10 determines all detected first and second signals except the selected signal to represent at least one false cell.

The receiver 10 may compare all detected first and second signals except the selected signal with a threshold before determining whether or not the detected first and second signals except the selected signal represent at least one false cell.

Action 706

The receiver 10 may add the at least one false cell to a history list, whereby the at least one false cell is to be excluded from further evaluation.

Figure 8:
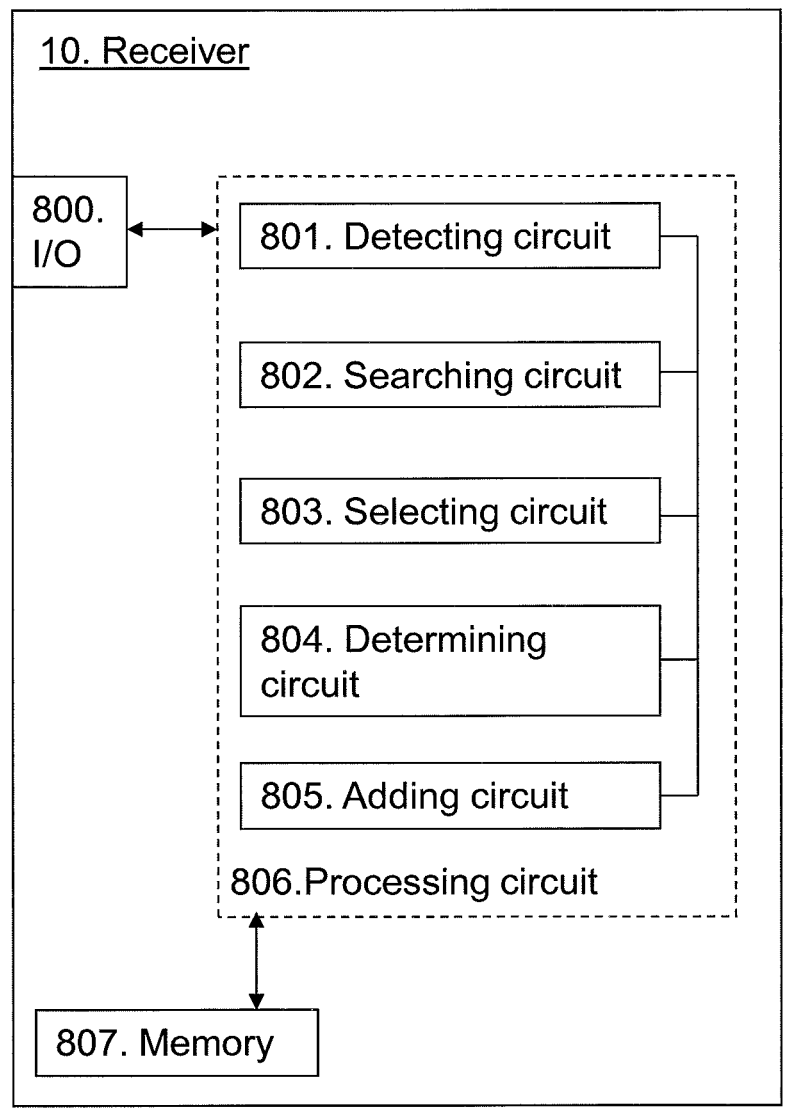
FIG. 8 is a schematic block diagram illustrating embodiments of a receiver.

To perform one or more of the method actions 701-706 in the receiver 10 for cell search to find an actual (i.e. a true) base station having a carrier frequency in a radio communications network 1, the receiver 10 comprises the following arrangement depicted in FIG. 8. As previously mentioned, the communications network 1 comprises the receiver 10 and a plurality of base stations 12, 14, 16, 18, each of which base stations 12, 14, 16, 18 provides radio coverage of at least one geographical area forming a cell 12*a*, 14*a*, 16*a*, 18*a*.

For example, the radio communication network 1 may be a WCDMA radio communication network.

The receiver 10 comprises an input and output port 800 configured to function as an interface for communication between e.g. the receiver 10 and the communications network 1.

Further, the receiver 10 comprises a detecting circuit 801. The detecting circuit 801 is configured to detect a first signal representative of a base station 12, 14, 16, 18 by performing slot synchronisation, frame synchronization, cell identification and by performing measurement of a signal quality of the first signal and comparison of the measured signal quality with a first threshold value.

The detecting circuit 801 may be configured to perform cell identification by performing base station scrambling code identification.

When one or more signals are detected, e.g. as described in relation to Actions and 702, the detecting circuit 801 is further configured to detect a broadcast radio channel representative of a base station 12, 14, 16, 18 for the selected second signal.

The radio broadcast channel may be a primary CCPCH or BCH.

A searching circuit 802 is further comprised in the receiver 10. When a first signal having a signal quality that is greater than the first threshold value has been detected, the searching circuit 802 is configured to search for at least one second signal representative of a base station 12, 14, 16, 18 for at least one frequency offset comprised in a set of offsets S3.

In some embodiments wherein the radio communication network 1 is a WCDMA radio communication network and wherein the receiver 10 is a WCDMA receiver, the at least one frequency offset comprised in the set of offsets S3 is at least one of +/−240 kHz, +/−3600 kHz, +/−3840 kHz, and +/−4080 kHz.

In some embodiments, the searching circuit 802 is further configured to perform slot synchronisation, frame synchronization, cell identification, and/or measurement of the signal quality of the at least one second signal.

However, in some other embodiments, the searching circuit 802 is further configured to only perform measurement of a signal quality of the second signal.

The searching circuit 802 may further be configured to compare measured signal quality of the at least one second signal with a second threshold value.

Further, the signal quality may be given by the received energy per chip divided by the power density in the band, Ec/No.

The receiver 10 comprises further a selecting circuit 803. When one or more signals are detected, the selecting circuit 803 is configured to select the signal with the highest signal quality. The selected signal may be the first signal or the at least one second signal.

In some embodiments, the receiver 10 further comprises a determining circuit 804 configured to determine all detected first and second signals except the selected second signal to represent at least one false cell.

The determining circuit 804 may be configured to compare all detected first and second signals except the selected signal with a threshold before determining whether or not the detected first and second signals except the selected signal represent at least one false cell.

An adding circuit 805 may further be comprised in the receiver 10. The adding circuit 805 may be configured to add the at least one false cell to a history list, whereby the at least one false cell is to be excluded from further evaluation.

Embodiments herein do also relate to a communication device comprising the receiver 10. As previously mentioned, the communication device may be a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network.

Further, embodiments herein do also relate to a computer program product with program code portions for carrying out one or more of the actions and/or or realizing one or more of the features described herein, when executed in a processing unit.

Although the description above contains many specifics, they should not be construed as limiting but as merely providing illustrations of some presently preferred embodiment. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of "consist at least of".

When using the word "action/actions" it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a receiver for cell search to find an actual base station having a carrier frequency in a radio communications network, the method comprising:
   detecting a first signal representative of a base station by performing:
   slot synchronization;
   frame synchronization;
   cell identification; and
   measuring a signal quality of the first signal and comparing the measured signal quality with a first threshold value;
   when it is detected that the first signal has a signal quality that is greater than the first threshold value, searching for at least one second signal representative of a base station for at least one frequency offset comprised in a set of offsets,
   when one or more second signals are detected, selecting a signal from the first and the one or more second signals with the highest signal quality, and detecting a broadcast radio channel representative of a base station for the signal selected from the first and the one or more second signals.

2. The method of claim 1, wherein the searching further comprises performing: slot synchronization; frame synchronization; cell identification; measurement of the signal quality of the at least one second signal.

3. The method of claim 1, wherein the searching further comprises performing: measurement of a signal quality of the second signal.

4. The method of claim 1, wherein the signal quality is given by a received energy per chip divided by a power density in the band, Ec/No.

5. The method of claim 1, wherein the method further comprises:
   determining all detected first and second signals except the signal selected from the first and the one or more second signals to represent at least one false cell.

6. The method of claim 5, further comprising:
   adding the at least one false cell to a history list, whereby the at least one false cell is to be excluded from further evaluation.

7. The method of claim 1, wherein the radio communication network is a WCDMA radio communication network, wherein the receiver is a WCDMA receiver, and wherein the at least one frequency offset comprised in the set of offsets is at least one of +/−240 kHz, +/−3600 kHz, +/−3840 kHz, and +/−4080 kHz.

8. A receiver for cell search to find an actual base station having a carrier frequency in a radio communications network, the receiver comprises:
   a detecting circuit configured to detect a first signal representative of a base station by performing:
   slot synchronization;
   frame synchronization;
   cell identification; and
   measurement of a signal quality of the first signal and comparison of the measured signal quality with a first threshold value;
   a searching circuit configured to, when it is detected that the first signal has a signal quality that is greater than the first threshold value, search for at least one second signal representative of a base station for at least one frequency offset comprised in a set of offsets,
   a selecting circuit configured to, when one or more signals are detected, select a signal from the first signal and the at least one second signal with the highest signal quality, and wherein
   the detecting circuit is further configured to, when one or more signals are detected, detect a broadcast radio channel representative of a base station for the signal selected from the first signal and the at least one second signal.

9. The receiver of claim 8, wherein the searching circuit further is configured to perform: slot synchronization; frame synchronization; cell identification; measurement of the signal quality of the at least one second signal.

10. The receiver of claim 8, wherein the searching circuit further is configured to perform measurement of a signal quality of the second signal.

11. The receiver of claim 8, wherein the signal quality is given by a received energy per chip divided by a power density in the band, Ec/No.

12. The receiver of claim 8, further comprising:
    a determining circuit configured to determine all detected first and second signals except the signal selected from the first signal and the at least one second signal to represent at least one false cell.

13. The receiver of claim 12, further comprising:
    an adding circuit configured to add the at least one false cell to a history list, whereby the at least one false cell is to be excluded from further evaluation.

14. The receiver of claim 8, wherein the receiver is a WCDMA receiver, wherein the radio communication network is a WCDMA radio communication network, and wherein the at least one frequency offset comprised in the set of offsets is at least one of +/−240 kHz, +/−3600 kHz, +/−3840 kHz, and +/−4080 kHz.

* * * * *